(12) United States Patent
Avila

(10) Patent No.: US 7,865,402 B2
(45) Date of Patent: Jan. 4, 2011

(54) INEXPENSIVE METHOD FOR PROVIDING VENDORS WITH THEIR UNIQUE BRAND OF MEDICAMENTS FOR RESALE

(76) Inventor: Alexander Avila, 1415 E. 11th Ave., Hialeah, FL (US) 33010

( * ) Notice: Subject to any disclaimer, the term of this patent is extended or adjusted under 35 U.S.C. 154(b) by 932 days.

(21) Appl. No.: 11/735,788

(22) Filed: Apr. 16, 2007

(65) Prior Publication Data

US 2008/0255959 A1    Oct. 16, 2008

(51) Int. Cl.
*G06Q 30/00* (2006.01)
(52) U.S. Cl. .......................................................... 705/26
(58) Field of Classification Search .................. 705/26, 705/27
See application file for complete search history.

(56) References Cited

U.S. PATENT DOCUMENTS 7,188,342 B2 * 3/2007 DeMello et al. ............. 717/173

2004/0210479 A1 * 10/2004 Perkowski et al. ............ 705/14

* cited by examiner

*Primary Examiner*—Adam Levine
(74) *Attorney, Agent, or Firm*—Ruben Alcoba, Esq.

(57) ABSTRACT

A method that allows manufactures of medicaments to provide vendors with vendor's uniquely branded OTC medicaments for resale, the method comprising the steps of providing a manufacture's website, allowing vendor's to access the website, then having vendors choose a medicament from the website, then allowing vendors to review an FDA approved description of the medicament, then having the vendor choose a certain template for the labeling of the medicament and allowing vendor to fill certain fields so that vendor's contact information and branding can be incorporated within the template, then having the vendor preview the labeling created by the website and providing vendor with an option to order a certain quantity of medicament or to go back to the previous screen of website, then if an order was made in the previous step, providing the vendor with a secured page for paying, then delivering the medicaments to the vendor.

1 Claim, No Drawings

INEXPENSIVE METHOD FOR PROVIDING VENDORS WITH THEIR UNIQUE BRAND OF MEDICAMENTS FOR RESALE

BACKGROUND

The present invention is an inexpensive method of delivering OTC (over the counter) medicaments to retailers/vendors, wherein retailers can place their own unique brand on medicaments.

The present invention allows retailers to compete with distributors of OTC medicaments, thereby reducing the costs of medicaments to the public. The costs are reduced because the middlemen in transactions are eliminated.

At the present time, it is very difficult to have OTC medicaments branded under a unique retailers name because of the costs involved in having the medicaments packaged, labeled and produced. For instance, to place a minimum order, one has to order in excess of 5,000 units of boxes, labels, and containers that house the medication.

Due to this realization, the inventors decided that they had to invent a method for allowing retailers to privately label their unique brands without having to spend large sums of money. By allowing retailers to spend less money when branding their unique OTC medicament, retailers are allowed to sell various types of medicaments under their unique brand. This enables retailers to test the marketplace for what products might be commercially feasible to sell under their brand, while minimizing the expenditure required when testing the marketplace.

An objective of the present invention is to allow retailers of OTC medicaments to uniquely brand their own OTC medicaments.

A further objective of the present invention is to allow retailers to brand OTC medicaments at a reduced cost.

Another objective of the present invention is to increase the sources of certain medicaments to the public, thereby reducing the price the public will have to pay for the medicaments.

Another objective of the present invention is to allow retailers the financial freedom to launch two or three lines of medicaments at the same time.

SUMMARY

The present invention allows vendors to privately label OTC medicaments at a reduced cost. This in turn allows vendors to sell medicaments to consumers at a reduced cost. The invention also allows vendors to test the market for more than one line of medicament at a time, thereby increasing the vendor's chances of success.

The present invention is a method that allows manufactures of medicaments to provide vendors with vendor's uniquely branded OTC medicaments for resale, the method comprising the steps of providing a manufacture's website, allowing vendor's to access the website, then having vendors choose a medicament from the website, then allowing vendors to review an FDA approved description of the medicament, then having the vendor choose a certain template, the template incorporates the FDA approved description, for the labeling of the medicament and allowing vendor to fill certain fields so that vendor's contact information and branding can be incorporated within the template, then having the vendor preview the labeling created by the website and providing the vendor with an option to order a certain quantity of medicament or to go back to the previous screen of website, then if an order was made in the previous step, providing the vendor with a secured page for paying for the order, then delivering the medicaments to the vendor.

The present invention allows vendors to distribute OTC medicaments under their own privately labeled brands. Costs normally associated with launching a new brand of medicament are substantially reduced by the present invention, for vendors are allowed to place vendor specific information on the manufacturer's website and then the manufacturer's provide vendors with their own privately labeled OTC medicaments.

The present invention reduces the costs associated with privately labeled product development. The costs are reduced by minimizing the costs of printing runs by allowing vendor not to have to order larger runs than necessary when launching new lines of medicaments and eliminating costs associated with having to graphically design a label.

These and other features, aspects and advantages of the present invention will become better understood with reference to the following description and appended claims.

DETAILED DESCRIPTION

A method that allows manufactures of medicaments to provide vendors with vendor's uniquely branded OTC medicaments for resale, the method comprising the steps of first providing a manufacture's website system that includes a website accessible through a computer based server that is accessible to any individual vendor using the web, the website system comprising, a first page having an index of a plurality of medicaments, each medicament being hyperlinked to a specific second page, wherein the second page displays at least one sub-medicament deriving from each individual medicament, the second page's sub-medicament being hyperlinked to a third page, wherein the third page displays an FDA complaint description of each individual sub-medicament and a customizing button, the customizing button being hyperlinked to a fourth page, the fourth page displays a plurality of templates, the templates incorporate the FDA complaint description, and a plurality of first fields that are to be filled by each individual vendor and a preview button, the preview button being hyperlinked to a fifth page, wherein the fifth page generates a display that shows the template selected, the template incorporates the first filled fields, hereinafter the display showing the template incorporating the filled fields shall be called a label, the fifth page further having a disclaimer approving the label and a second field to place a quantity of product to be ordered and a submission button, the submission button being hyperlinked to a sixth secured page wherein each vendor can place their financial information and a check out button. Then, having a vendor access the website using a computer. Then, having the vendor select a first medicament from the first page of the manufacturer's website. Next, having the vendor select a sub-medicament from the second page of the manufacture's website. Then, having the vendor review the FDA compliant description of each sub-medicament from the third page of the manufacturer's website and if the vendor approves of the sub-medicament, then vendor proceeds to select the customizing button of the third page. Next, having the vendor select a template and fill the first fields of the fourth page of the website and then select the preview button. Then, having the vendor review the label on the fifth page, if the vendor approves the label, then having the vendor select a disclaimer approving the label and then having the vendor fill a numerical quantity to be ordered on the second field, then having the vendor select the submission button of the fifth page. Next having the vendor enter vendor's financial information on the sixth page and then selecting the check out button of the sixth page. Then, having the manufacturer of the website system review financial information and then either approve or deny the order. And lastly, having the manufacturer either deliver the FDA approved sub-medicament or send a rejection of order to the vendor.

The manufacture of the medicaments must be FDA approved to produce the medicaments. Each medicament delivered to Vendor has a national drug code associated with the manufacturer of the product, the drug code is incorporated into each label.

In the present invention, the term medicament is described to mean any of the following: nutraceuticals, cosmeceuticals, cosmetics, and over the counter medications.

An advantage of the present invention is that it allows retailers of medicaments to uniquely brand their own medicaments.

A further advantage of the present invention is that it allows retailers to brand medicaments at reduced costs.

Another advantage of the present invention is that it increases the source of certain medicaments to the public, thereby reducing the price the public will have to pay for the medicaments.

Another advantage of the present invention is that it allows retailers the financial freedom to launch two or three lines of medicaments at the same time.

Although the present invention has been described in considerable detail with reference to certain preferred versions thereof, other versions are possible. Therefore the spirit and the scope of the claims should not be limited to the description of the preferred versions contained herein.

What is claimed is:

1. A method that allows manufactures of medicaments to provide vendors with vendor's uniquely branded OTC medicaments for resale, the method comprising the steps of:
   providing a manufacture's website system that includes a website accessible through a computer based server that is accessible to any individual vendor using the web, the website system comprising, a first page having an index of a plurality of medicaments, each medicament being hyperlinked to a specific second page, wherein the second page displays at least one sub-medicament deriving from each individual medicament, the second page's sub-medicament deriving from each individual medicament, the second page's sub-medicament being hyperlinked to a third page, wherein the third page displays an FDA compliant description of each individual sub-medicament and a customizing button, the customizing button being hyperlinked to a fourth page, the fourth page displays a plurality of first fields that are to be filled by each individual vendor and a preview button, the preview button being hyperlinked to a fifth page, wherein the fifth page generates a display that shows the template selected, the template incorporates the first filled fields, hereinafter the display showing template incorporating the filled fields shall be called a label, the fifth page further having a disclaimer approving the label and a second field to place a quantity of product to be ordered and a submission button, the submission button being hyperlinked to a sixth secured page wherein each vendor can place their financial information and a check out button;
   having a vendor access the website using a computer;
   then having the vendor select a first medicament from the first page of the manufacturer's website;
   next having the vendor select a sub-medicament from the second page of the manufacture's website;
   then having the vendor review the FDA compliant description of each sub-medicament from the third page of the manufacturer's website and if the vendor approves of the sub-medicament, then vendor proceeds to select the customizing button of the third page;
   next having the vendor select a template and fill the first fields of the fourth page of the website and then select the preview button;
   then having the vendor review the label on the fifth page, if the vendor approves the label, then having the vendor select a disclaimer approving the label and then having the vendor fill a numerical quantity to be ordered on the second field, then having the vendor select the submission button of the fifth page;
   next having the vendor enter vendor's financial information on the sixth page and then selecting the check out button of the sixth page;
   then, having the manufacturer of the website system review financial information and then either approve or deny the order; and
   then having the manufacturer either deliver the sub-medicament or send a rejection of order to the vendor.

* * * * *